United States Patent Office 3,775,481
Patented Nov. 27, 1973

3,755,481
OXIDATION OF HYDRINDANTIN
Alan E. Pierce, 3316 Brookview Road,
Rockford, Ill. 61107
No Drawing. Filed May 3, 1971, Ser. No. 139,851
Int. Cl. C07c 49/82
U.S. Cl. 260—590
9 Claims

ABSTRACT OF THE DISCLOSURE

Ninhydrin is prepared by a process which involves oxidizing hydrindantin using chlorine, bromine, or a combination of chlorine and bromine. The oxidation reaction proceeds at a commercially feasible rate and in a manner such that undesirable side products such as noxious oxides are not formed. In addition, by using the illustrated process, Ninhydrin can be recovered in good yields.

BACKGROUND OF THE INVENTION

The present invention relates to the oxidation of hydrindantin and, more particularly, to the oxidation of hydrindantin in order to prepare Ninhydrin in good yields and at commercially feasible reaction rates.

Hydrindantin is a well-known and commercially available material. In addition to being useful itself in a variety of applications, it is also useful as a precursor for the preparation of Ninhydrin. As described in Wood, U.S. Pat. 3,366,690, Ninhydrin can be prepared by reacting hydrindantin with aqueous nitric acid. Ninhydrin, of course, is a valuable reagent in analytical work for the detection of amino acids.

In theory, the conversion of hydrindantin to Ninhydrin appears to be a comparatively easy operation involving simply the oxidation of hydrindantin. However, in fact, many problems are encountered when the oxidation is attempted in a commercially attractive manner. Among other requirements, the commercial production of Ninhydrin by hydrindantin oxidation demands that hydrindantin be converted to Ninhydrin in good yield and in a commercially feasible reaction time. In addition, the reaction should be accomplished with an inexpensive oxidizing agent.

To an extent, oxidation of hydrindantin by the aforementioned Wood method using nitric acid can be used to prepare Ninhydrin in good yield and in acceptable reaction times. However, the use of this method is accompanied by an undesirable frothing of the reaction charge during oxidation due to the evolution of gaseous oxides such as NO and $NO_2$. Since such evolved oxides cannot be directly discharged into the atmosphere, the use of the Wood method necessitates involved, and often expensive, oxide absorbing procedures such as repeated scubbings.

OBJECTS OF THE INVENTION

Accordingly, it is principal object of the present invention to provide a commercially attractive process for oxidizing hydrindantin to Ninhydrin wherein Ninhydrin can be recovered in a good yield. A related object is to provide such a process wherein noxious oxide removal steps are not necessary.

A further object is to provide a process having the characteristics recited in the object set forth above wherein an inexpensive oxidizing agent is employed. A related object is to provide such a process wherein only a small excess of oxidizing agent is required.

A further object is to provide a process having the aforementioned characteristics wherein the product which is not directly recovered as Ninhydrin can be easily isolated as hydrindantin and thus be available for subsequent oxidation reactions.

Other objects and advantages of the present invention will become apparent upon reading the following detailed description of the invention.

SUMMARY OF THE INVENTION

In accordance with the present invention, hydrindantin is oxidized to Ninhydrin using chlorine and/or bromine as the oxidizing agent. As opposed to many other oxidizing agents, the use of these halogens is believed to be particularly unique in permitting oxidation to proceed at a commercially feasible rate and in a manner such that undesirable side products such as noxious oxides are not formed. In addition, the halogens are inexpensive oxidizing agents.

In accordance with a preferred aspect of the present invention a combination of bromine and chlorine are employed during oxidation. The use of the combination reduces the amount of bromine (the more expensive of the two halogens) which is required while not adversely affecting the necessary reaction time.

DESCRIPTION OF THE PREFERRED EMBODIMENTS

While the invention is susceptible of various modifications and alternative constructions, there will herein be described in detail the preferred embodiments. It is to be understood, however, that it is not intended to limit the invention to the specific forms disclosed. On the contrary, it is intended to cover all modifications and alternative constructions falling within the spirit and scope of the invention as expressed in the appended claims.

For example, while the present invention will be particularly described with respect to the preparation of Ninhydrin wherein the starting reagent is an unsubstituted hydrindantin, it is to be understood that the illustrated process is equally applicable to the oxidation of hydrindantins containing substituents on one or both of the benzene rings. Thus, while hydrindantin is used for the preparation specifically of Ninhydrin, substituted hydrindantins can be employed where oxidized products other than specifically Ninhydrin are desired. Examples of such substituted hydrindantins include the following: (1) hydrindantins wherein the benzene ring(s) contains one or more hydrocarbon substituents either open chain or cyclic, e.g., 3-methyl-, 4-methyl-, tetraphenyl-, benz[f], etc., (2) hydrindantin wherein the benzene ring(s) contains one or more halogen substituents, e.g., 4-bromo-, 4-chloro-, tetrabromo-, tetrachloro-, tetraiodo-, etc.; (3) hydrindantins wherein the benzene ring(s) contains a nitro substituent, e.g., 3-nitro-, 4-nitro-, etc.; (4) hydrindantin wherein the benzene ring(s) contains an acid substituent, e.g., 4-carboxy-, 4-sulfo-, etc.

In its broadest aspects, the process of the present invention is accomplished by oxidizing hydrindantin with bromine and/or chlorine and, thereafter, recovering the Ninhydrin so produced. The oxidation reaction can be accomplished at a temperature of about 40° C.–100° C. with maximum yields of Ninhydrin being ordinarily achieved when the temperature is about 55° C.–75° C. At oxidation temperatures of above about 55° C., the reaction is ordinarily completed in about 30 minutes when bromine is present. With the use of chlorine alone, the reaction ordinarily takes about 1 hour.

A particularly desirable feature of the present process resides in the fact that no adverse affect on product yield results if the Ninhydrin formed by the reaction is not immediately removed from the reaction medium after its preparation. Thus, commercially feasible reaction charge hold-up times can be employed.

To effect oxidation in the manner indicated herein, a slurry of hydrindantin with water is initially formed and chlorine or bromine or both thereafter added. Completion of the oxidation reaction is indicated by the disappearance of solid hydrindantin. Ninhydrin can then be recovered by cooling the reaction mixture and separating the precipitated solid from the mother liquor. Preferably, in order to increase the purity of the Ninhydrin recovered by the present process, the reaction solution is treated with a decolorizing agent such as carbon prior to the precipitation of Ninhydrin.

Alternatively, the present oxidation process can be accomplished by suspending or dissolving hydrindantin in a liquid other than water. The principal requirements of the liquid solvent or suspending medium are that it permit the reaction to proceed and that the formed Ninhydrin can be readily recovered therefrom. Thus, liquids in which both hydrindantin and Ninhydrin are insoluble are generally not useful. Similarly, liquids in which Ninhydrin is excessively soluble are not preferred due to the associated difficulty in separating and recovering the oxidized product. Examples of liquids other than water in which hydrindantin can be suspended or dissolved during oxidation include acetic acid and ethyl acetate.

The following examples illustrate several embodiments of the present invention. All parts and percentages are by weight unless otherwise stated. Temperatures are reported in degrees C.

EXAMPLE I

Hydrindantin dihydrate (71.6 g., 0.2 mole) is stirred with 5 parts of water at 55° C. and a slight excess over 0.2 mole bromine is introduced as fast as it is consumed, judging by color of the charge and the vapor over it. When a permanent yellow color is obtained the mixture is heated to 75° to bring all Ninhydrin into solution. The solution is clarified by filtration and cooled to 5°. The crystallized Ninhydrin is filtered, washed and dried. The yield is 58.7 g., 82.5%, M.P. 257.5–258° C. A small excess of sodium formaldehyde sulfoxylate is then added to the filtrate and about 6 g. of hydrindantin (8% based on original amount) precipitates. This hydrindantin can then be reoxidized in the same manner.

EXAMPLE II

The amounts and conditions of Ex. I are repeated except that instead of bromine, chlorine is passed into the charge as fast as consumed as indicated by a trap on the vent of the reaction vessel. About one hour is required for reaction of all the hydrindantin. The charge is filtered hot at 70° and cooled to 0°. Ninhydrin, 57 g., is obtained, 80% yield, M.P. 255–57.5° C. Sodium formaldehyde sulfoxylate is again added to the filtrate and an additional recovery yield of 12% of hydrindantin obtained.

While the simple use of bromine or chlorine in the manner previously illustrated is accompanied by many desirable advantages, in accordance with a further aspect of the present invention it has been discovered that by using a combined oxidation system comprised of bromine and chlorine, a rapid oxidation can be obtained with only a small quantity of bromine present. When using such a combined system, the molar quantity of bromine used need only be about 10% of that stoichiometrically required for oxidation with the combined molar amount of chlorine and bromine being about equal to the stoichiometrically required amount. Since chlorine is less expensive than bromine, the economic advantage of using such a combined system is apparent. Alternatively, instead of the initial addition of elemental bromine, hydrogen bromide (HBr) can be used as the bromine source. However, such is not preferred since HBr is more expensive than Br$_2$ and the necessary reaction time is longer.

The following examples illustrate further embodiments of the present invention. All parts and percentages are by weight unless otherwise stated. Temperatures are reported in degrees C.

EXAMPLE III

Hydrindantin dihydrate (143 g., 0.4 mole) is stirred with 500 ml. water and 6.4 g. (0.04 mole) bromine added. The mixture is stirred and heated at 65–70° C. while chlorine is introduced. After the hydrindantin completely dissolves, the chlorine addition is stopped and the solution chilled. The crystallized Ninhydrin is filtered at 5° C., washed acid-free and dried. The nearly white product weighs 124 g., a yield of 87%, M.P. 258.5–259.5° C. The Ninhydrin in the filtrate is recovered as hydrindantin (14.5 g., 10% yield) by the addition of 20 g. sodium formaldehyde sulfoxylate.

EXAMPLE IV

Hydrindantin dihydrate (71.6 g., 0.2 mole) is stirred with 130 ml. acetic acid and 10 ml. water. At 70° C. 2 ml. bromine is added followed by chlorine addition until the hydrindantin dissolves and the color of bromine disappears. The clear solution is diluted with 250 ml. water and cooled, yielding a precipitate of 39 g. Ninhydrin, a yield of 55%. The filtrate is treated with sodium formaldehyde sulfoxylate as described in Ex. I.

EXAMPLE V

Hydrindantin dihydrate (71.6 g., 0.2 mole) is stirred with 360 ml. molar hydrobromic acid and heated to 55°. Chlorine gas is passed in and the hydrindantin dissolves. The mixture is heated to 70°, filtered, and Ninhydrin obtained by cooling the filtrate. The yield of Ninhydrin is 80%, M.P. 255–257° C. A recovery crop of 15% of hydrindantin is then obtained from the filtrate as previously described.

I claim as my invention:

1. In the process for preparing ninhydrin comprising oxidizing hydrindantin, while dissolved or suspended in a liquid, in the presence of an oxidizing agent and at a temperature of about 40° C.–100° C., the improvement wherein the oxidizing agent is bromine or chlorine.

2. The process of claim 1 wherein the oxidizing agent is bromine.

3. In the process for preparing Ninhydrin comprising oxidizing hydrindantin, while dissolved or suspended in a liquid, in the presence of an oxidizing agent and at a temperature of about 40° C.–100° C., the improvement wherein oxidation is accomplished in the presence of an oxidizing agent mixture comprised of chlorine and bromine or chlorine and hydrogen bromide.

4. The process of claim 3 wherein the oxidizing agent mixture comprises chlorine and bromine.

5. The process of claim 4 wherein bromine is present in an amount of about 10% of that stoichiometrically required for oxidation.

6. The process of claim 1 wherein oxidation is effected at a temperature of about 55° C.–75° C.

7. The process of claim 1 wherein the liquid is water, acetic acid, or ethyl acetate.

8. The process of claim 3 wherein oxidation is effected at a temperature of about 55° C.–75° C.

9. The process of claim 3 wherein the liquid is water, acetic acid, or ethyl acetate.

References Cited

UNITED STATES PATENTS

| | | | |
|---|---|---|---|
| 3,366,690 | 1/1968 | Wood | 260—590 |
| 2,643,269 | 6/1953 | Augustine | 260—590 |
| 3,165,554 | 1/1965 | Wineland | 260—596 X |

DANIEL D. HORWITZ, Primary Examiner